United States Patent
Azuma

(10) Patent No.: US 9,880,952 B2
(45) Date of Patent: Jan. 30, 2018

(54) BUS ACCESS CONTROLLER, HARDWARE ENGINE, CONTROLLER, AND MEMORY SYSTEM

(71) Applicant: Toshiba Memory Corporation, Minato-ku (JP)

(72) Inventor: Tetsuhiko Azuma, Shinagawa (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 328 days.

(21) Appl. No.: 14/713,061

(22) Filed: May 15, 2015

(65) Prior Publication Data

US 2016/0210249 A1    Jul. 21, 2016

Related U.S. Application Data

(60) Provisional application No. 62/103,828, filed on Jan. 15, 2015.

(51) Int. Cl.
| | |
|---|---|
| *G06F 13/16* | (2006.01) |
| *G06F 13/40* | (2006.01) |
| *G06F 13/42* | (2006.01) |

(52) U.S. Cl.
CPC ...... *G06F 13/1642* (2013.01); *G06F 13/1673* (2013.01); *G06F 13/4031* (2013.01); *G06F 13/4282* (2013.01)

(58) Field of Classification Search
CPC ............. G06F 12/0246; G06F 13/1642; G06F 13/1673
USPC ................................. 710/107, 112
See application file for complete search history.

(56) References Cited

U.S. PATENT DOCUMENTS

| | | | |
|---|---|---|---|
| 6,020,759 A | 2/2000 | Heile | |
| 6,438,737 B1 | 8/2002 | Morelli et al. | |
| 7,941,730 B2 | 5/2011 | Ogawa et al. | |
| 8,886,881 B2 * | 11/2014 | Bakke | G06F 11/1076 711/114 |
| 8,892,842 B2 * | 11/2014 | Kim | G06F 12/0246 711/103 |
| 9,336,135 B1 * | 5/2016 | Salessi | G06F 12/0246 |
| 2012/0079172 A1 * | 3/2012 | Yoshida | G06F 12/0607 711/103 |
| 2012/0192032 A1 * | 7/2012 | Iwasaki | G06F 11/1048 714/758 |
| 2013/0191609 A1 * | 7/2013 | Kunimatsu | G06F 12/10 711/203 |
| 2016/0313943 A1 * | 10/2016 | Hashimoto | G06F 3/061 |
| 2017/0068621 A1 * | 3/2017 | Watanabe | G06F 12/0891 |

FOREIGN PATENT DOCUMENTS

| | | |
|---|---|---|
| JP | 11-220382 | 8/1999 |
| JP | 4510353 | 7/2010 |
| JP | 4887824 | 2/2012 |

* cited by examiner

*Primary Examiner* — Brian T Misiura
(74) *Attorney, Agent, or Firm* — Oblon, McClelland, Maier & Neustadt, L.L.P.

(57) ABSTRACT

According to one embodiment, there is provided a bus access controller including a memory, multiple buffers, and an issuance circuit. Information necessary for bus access can be set in the memory. The multiple buffers store information set in the memory. The issuance circuit is connected to a bus. The issuance circuit issues a bus-access instruction, according to information stored in a buffer selected from among the multiple buffers in response to a request.

18 Claims, 9 Drawing Sheets

FIG.6

| EVENT ENABLE VALUE | EVENT CONDITION VALUE | CONDITION FOR PERMISSION TO ISSUE |
|---|---|---|
| 0 | – | ISSUING IS PERMITTED REGARDLESS OF ISSUING EVENT VALUE |
| 1 | 0 | IF ISSUING EVENT VALUE IS 0, ISSUING IS PERMITTED |
| 1 | 1 | IF ISSUING EVENT VALUE IS 1, ISSUING IS PERMITTED |

US 9,880,952 B2

BUS ACCESS CONTROLLER, HARDWARE ENGINE, CONTROLLER, AND MEMORY SYSTEM

CROSS-REFERENCE TO RELATED APPLICATIONS

This application is based upon and claims the benefit of priority from U.S. Provisional Application No. 62/103,828, filed on Jan. 15, 2015; the entire contents of which are incorporated herein by reference.

FIELD

Embodiments described herein relate generally to a bus access controller, a hardware engine, a controller, and a memory system.

BACKGROUND

Bus access controllers receive an access request and perform bus access according to the access request. At this time, it is desired that the bus access controller be able to flexibly deal with a change in the specification concerning bus access.

BRIEF DESCRIPTION OF THE DRAWINGS

FIG. 6 is a diagram showing the condition for permission to issue a bus-access instruction in the embodiment;

DETAILED DESCRIPTION

In general, according to one embodiment, there is provided a bus access controller including a memory, multiple buffers, and an issuance circuit. Information necessary for bus access can be set in the memory. The multiple buffers store information set in the memory. The issuance circuit is connected to a bus. The issuance circuit issues a bus-access instruction, according to information stored in a buffer selected from among the multiple buffers in response to a request.

Exemplary embodiments of a memory system will be explained below in detail with reference to the accompanying drawings. The present invention is not limited to the following embodiments.

Embodiment

Figure 1:
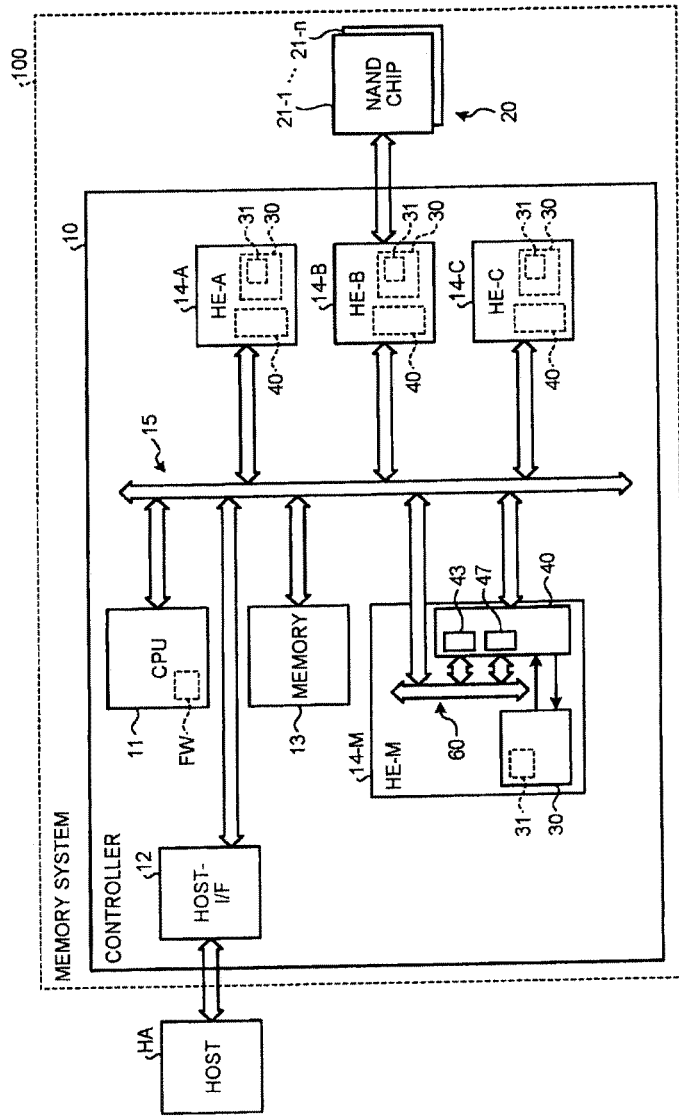
FIG. 1 is a diagram showing the configuration of a memory system according to an embodiment.

A memory system 100 according to the embodiment will be described using FIG. 1. FIG. 1 is a diagram showing the configuration of the memory system 100.

The memory system 100 is connected to a host HA via a communication path and functions as an external storage medium for the host HA. The memory system 100 is, for example, a flash memory for embedded use, an SSD (Solid State Drive), or the like. The host HA is, for example, a personal computer, a mobile telephone, an imaging device, or the like.

The memory system 100 has a NAND flash memory (nonvolatile semiconductor memory) 20 and a controller 10.

The NAND flash memory 20 has a memory cell array having multiple memory cells arranged in a matrix. Each individual memory cell can store a multiple value using an upper page and a lower page. The NAND flash memory 20 is configured with multiple blocks that are units for data erasure arranged. Further, each block is formed of multiple pages. Each page is a unit for data writing and reading. The NAND flash memory 20 is formed of, e.g., multiple NAND memory chips 21-1 to 21-n.

The controller 10 has a CPU 11, a host I/F 12, a memory 13, a bus 15, and multiple hardware engines 14-M, 14-A, 14-B, 14-C.

The CPU 11 controls the memory system 100 overall. The CPU 11 includes firmware FW and performs control operation according to the firmware FW. For example, the CPU 11 performs control over reading data from the NAND flash memory 20 according to a read request from the host HA. The CPU 11 performs control over writing data into the NAND flash memory 20 according to a write request from the host HA.

The memory 13 can be used as a work area of the CPU 11. Also, the memory 13 can be used as a buffer for storing data. For example, the memory 13 is used as a buffer for storing data read from the NAND memory chips 21.

The host I/F 12 is an interface to connect to the host HA. When receiving a request from the host HA, the host I/F 12 transfers the received request to the CPU 11.

The bus 15 connects the CPU 11, host I/F 12, memory 13, and the multiple hardware engines 14-M, 14-A, 14-B, 14-C to each other.

The controller 10 performs various processes such as wear leveling and logical-physical conversion processing. For example, a plurality of functional blocks having dedicated functions respectively corresponding to various processes are provided. At this time, where one functional block sets information or acquires information from another block in order to use the function of the other block, a first method which sends/receives information directly via dedicated signal lines can be thought of.

However, if the function of the block changes due to a specification change of the other block, then an increase/decrease in information to be set for the block or a change in information itself to be acquired for the block may occur. In the first method, since the specification change of the other block can bring a necessity for a change to the dedicated signal lines, the cost is likely to increase. In order to suppress an increase in the cost, a method which performs bus access using the bus 15 to increase versatility is fundamentally more effective than the first method which sends/receives information via dedicated signal lines.

As a method of performing bus access, there is a second method which has the CPU 11 itself control its bus access, but if the CPU 11 directly controls all the various processes, the CPU 11 performs the processes sequentially, so that the time until all the various processes are finished tends to be longer.

As another method of performing bus access, there is a third method which provides multiple hardware engines to deal with various processes so that the hardware engines autonomously perform processes independently of the CPU 11. In the third method, multiple hardware engines 14-M, 14-A, 14-B, 14-C are provided in the controller 10.

That is, with the controller 10, it is desired to perform various processes in parallel, such as an improvement in the speed of access to the NAND memory chip 21, an improvement in processing capability of data transfer requested from the host HA, error correction function, processing of logical-physical address conversion table information. Accordingly, the controller 10 incorporates multiple types of hardware functional blocks (hardware engines 14-M, 14-A, 14-B, 14-C) as respective dedicated hardware for the various processes.

Where the processing is divided into parts, the processes can be executed simultaneously in parallel. Further, because the amount of data to be transferred from the CPU 11 to the hardware engines 14 is suppressed to a low level, the time of bus occupation by the CPU 11 can be reduced, so that an increase in the processing time due to bus access contention can be reduced. Thus, the time until all the various processes are finished can be easily shortened.

Note that if each hardware engine 14 is made to be a dedicated circuit completely specific to a function, then with a change in the specification, a change in the circuit of the block in charge of bus access that corresponds to that change is needed. Accordingly, a new development cost may occur.

Therefore, in the present embodiment, a bus access controller 40 in charge of bus access in each hardware engine 14 is configured such that basic information (bus-access pattern information that is a base) necessary for bus access can be set in the bus access controller 40. Further, the bus access controller 40 is configured such that the basic bus-access pattern information can be changed as needed, thus making the bus-access pattern information have flexibility.

Here, the bus-access pattern information (bus-access information) is information necessary for bus access. The bus-access pattern information includes address information of a functional block (hardware engine 14) that is the target (access destination) used in bus access and information indicating the type of bus access such as reading/writing. The address information includes information to identify which of multiple hardware engines 14 in the controller 10 the target is, and information to specify an address in terms of storage units in the register (or memory) of that hardware engine 14.

FIG. 1 shows the positioning in the controller 10 of the bus access controller 40 configured to be programmable. Some of the hardware engines (HE) 14 perform slave operation singly, and others perform master operation. The slave operation is passive operation where necessary information is supplied from the master side. The master operation is active operation for a hardware engine or the like on the slave side such as setting various register values, ascertaining operation status, and data processing and transfer.

Although description will be made below focusing on the case where the hardware engine 14-M performs master operation in bus access while the other hardware engines 14-A, 14-B, 14-C perform slave operation in bus access, the same applies to the case where another hardware engine 14-A, 14-B, 14-C performs master operation.

Setting register values and ascertaining the operation status of the other hardware engines 14-A, 14-B, 14-C by the hardware engine 14-M are performed through bus access via a bus (bus matrix) 15. Each hardware engine 14 has a sequencer 30, a bus access controller 40, and an internal bus 60. The sequencer 30 has a register (or memory) 31. The sequencer 30 is, for example, a control circuit. The bus access controller 40 is connected to the bus 15 via the internal bus 60 or not via the internal bus 60.

In the hardware engine 14-M, the sequencer 30 controls the execution of bus access to perform bus access to another desired hardware engine 14-A, 14-B, 14-C.

For example, in the hardware engine 14-M, the sequencer 30 supplies a request to access another hardware engine 14-A, 14-B, 14-C to the bus access controller 40. The bus access controller 40 performs bus access according to the access request from the sequencer 30. The bus access controller 40 can set a value in the register 31 of the hardware engine 14-A or ascertain the value of the register 31 according to the access request from the sequencer 30. By this means, the operation status of the hardware engine 14-A can be controlled or ascertained.

Figure 2:
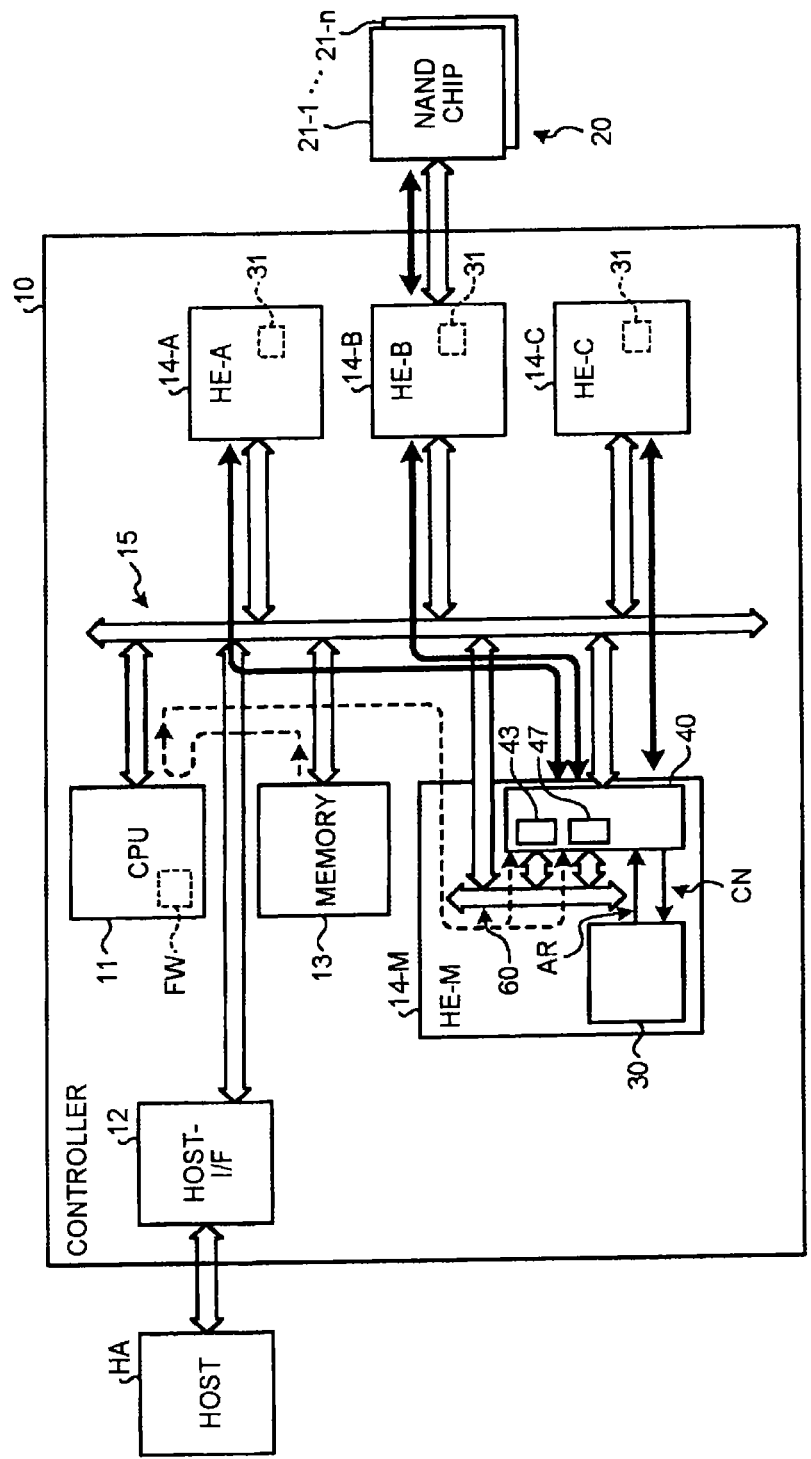
FIG. 2 is a diagram showing the operation of the memory system according to the embodiment.

In order for the bus access controller 40 to perform bus access, initial setting needs to be performed as shown in FIG. 2. FIG. 2 is a diagram showing the operation of the memory system 100.

In the hardware engine 14-M, the bus access controller 40 is programmable with the bus-access pattern information (bus-access information). The bus access controller 40 has a bus-access pattern memory (hereinafter a memory) 43 and a bus-access pattern selecting memory read circuit (hereinafter a memory read circuit) 47. The memory read circuit 47 is, for example, a dedicated control register. Before bus access is performed, the CPU 11 or the like sets the memory 43 and the memory read circuit 47 in advance.

For example, the CPU 11 loads initial setting information into the memory 13 according to the firmware FW. Then the CPU 11 transfers the bus-access pattern information (bus-access information) included in the initial setting information from the memory 13 via the bus 15 and the internal bus 60 to the memory 43 in the bus access controller 40 of the hardware engine 14-M as indicated by a broken-line arrow in FIG. 2. With this operation, the CPU 11 sets the bus-access pattern information, a base, in the memory 43 in the bus access controller 40 of the hardware engine 14-M in advance before bus access is performed.

Further, the CPU 11 transfers bus-access pattern setting information included in the initial setting information from the memory 13 via the bus 15 and the internal bus 60 to the memory read circuit 47 in the bus access controller 40 of the hardware engine 14-M as indicated by a broken-line arrow in FIG. 2. The bus-access pattern setting information is management information for the information contained in the memory 43.

A plurality of bus-access pattern information different in access destination are set in the bus access controller 40. The bus access controller 40 receives an access request AR from the sequencer 30. The bus-access pattern information corresponding to the access destination (target) specified in the access request AR is selected from the plurality of bus-access pattern information. The bus access controller 40 issues a bus access instruction to perform bus access according to the selected bus-access pattern information.

For example, the bus access controller 40 issues a bus access instruction specifying another hardware engine 14-A, 14-B, 14-C as the access destination (target) as indicated by a solid-line arrow in FIG. 2. Thus, the bus access controller 40 performs bus access to the other hardware engine 14-A, 14-B, 14-C. That is, the bus access controller 40 of the hardware engine 14-M can write a given value into the register 31 and read the value of the register 31 via the bus access controller 40 of the other hardware engine 14-A, 14-B, 14-C.

The bus access controller 40 supplies an access completion notice CN to the sequencer 30 when the bus access finishes.

Figure 3:
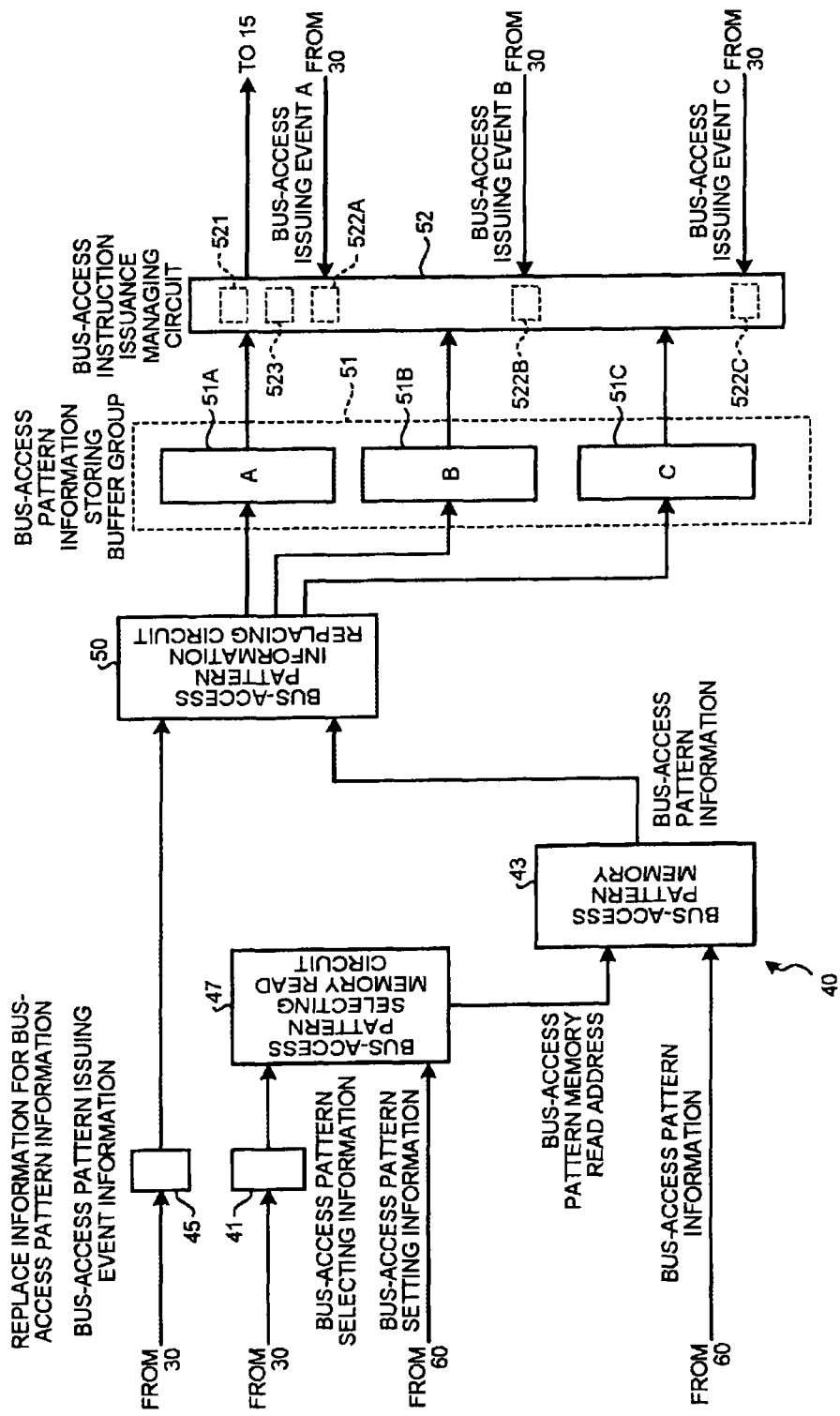
FIG. 3 is a diagram showing the configuration of a bus access controller in the embodiment.

Next, the configuration of the bus access controller 40 will be described in more detail using FIG. 3. FIG. 3 is a diagram showing the configuration of the bus access controller 40.

The bus access controller 40 has a bus-access pattern information replacing circuit (hereinafter a replacing circuit) 50, a bus-access pattern information storing buffer group (hereinafter a buffer group) 51, and a bus-access instruction issuance managing circuit (issuance circuit) 52 as well as the memory 43, the memory read circuit 47, and the internal bus 60. The buffer group 51 has multiple buffers 51A, 51B, 51C.

At initial setting, the bus-access pattern information is transferred by the CPU 11 from the memory 13 via the bus 15 and the internal bus 60 to the memory 43. With this arrangement, the bus-access pattern information is set in the memory 43. The memory 43 is a memory in which to set bus-access patterns and is rewritable so that the patterns can be changed. Thus, if bus-access patterns need to be changed due to a change in the specification after product shipment, the memory 43 can be rewritten to change bus-access patterns. That is, the memory 43 can be programmed with the bus-access pattern information. The bus-access pattern information is information about a bus-access pattern and is address information of a functional block (hardware engine 14) that is the target (access destination) used in bus access and information indicating the type of bus access such as reading/writing. Note that the bus-access pattern information may further include a write data value, ON/OFF information of the replacing function and the like (see FIG. 4).

At initial setting, the bus-access pattern setting information is transferred by the CPU 11 from the memory 13 via the bus 15 and the internal bus 60 to the memory read circuit 47. The memory read circuit 47 may be constituted by, e.g., a control register.

If the bus-access pattern information are set in the memory 43, the bus-access pattern setting information includes information denoting the start address of each bus-access pattern information group and the number of bus-access pattern information forming the bus-access pattern information group. That is, the memory 43 stores the bus-access pattern information group including a plurality of bus-access pattern information and information about the execution order of the plurality of bus-access pattern information. At this time, the number of bus-access pattern information to be included in the bus-access pattern information group can be set arbitrarily in the bus-access pattern setting information.

Further, bus-access pattern selecting information is input from the sequencer 30 via an input node 41 to the memory read circuit 47. The bus-access pattern selecting information is included in an access request AR from the sequencer 30 (see FIG. 2) and designates a bus-access pattern for the bus access controller 40 to execute.

The memory read circuit 47 supplies a bus-access pattern memory read address designating bus-access pattern information to be executed based on the bus-access pattern setting information and the bus-access pattern selecting information to the memory 43. The memory 43 stores a plurality of bus-access pattern information (see FIG. 5) and supplies bus-access pattern information designated by the bus-access pattern memory read address from among the plurality of bus-access pattern information to the replacing circuit 50.

Information (replace information or change information) to replace at least part of bus-access pattern information is input from the sequencer 30 via an input node 45 to the replacing circuit 50. The replace information for bus-access pattern information is information included in the access request AR from the sequencer 30 (see FIG. 2) and is part of the bus-access pattern information to be executed. For example, where the address, data, etc., in the bus-access pattern information to be executed change according to the situation, the replace information for the bus-access pattern information includes the address, data, etc., that change according to the situation.

The replacing circuit 50 replaces the bus-access pattern information with the replace information depending on ON/OFF information of the replacing function included in the bus-access pattern information supplied from the memory 43. That is, if the ON/OFF information of the replacing function is set at ON, the replacing circuit 50 replaces part of the bus-access pattern information with the replace information to create bus-access pattern information to be stored in the buffer 51A, 51B, 51C. If the ON/OFF information of the replacing function is set at OFF, the replacing circuit 50 creates bus-access pattern information to be stored in the buffer 51A, 51B, 51C without replacing part of the bus-access pattern information with the replace information.

Also, bus-access pattern issuing event information is input from the sequencer 30 via an input node 45 to the replacing circuit 50. The bus-access pattern issuing event information includes the designation of a condition for permission to issue a bus-access instruction (FIG. 6).

The buffer 51A, 51B, 51C corresponds to an access destination (target). The replacing circuit 50 stores the created bus-access pattern information into the buffer 51A, 51B, 51C corresponding to the access destination (target). The replacing circuit 50 stores the bus-access pattern issuing event information into the buffer 51A, 51B, 51C corresponding to the access destination (target) to be associated with the bus-access pattern information. For example, bus-access pattern information and bus-access pattern issuing event information whose access destination (target) is the hardware engine 14-A are stored into the buffer 51A.

Thus, bus accesses to different access destinations (targets) can be performed out of order (regardless of issuing order), and hence efficient accesses are possible.

In contrast, accesses to the same access destination (target) are organized to be issued in order (keeping the order) because the order of accesses needs to be guaranteed. For example, where banks A1 and A2 are arranged in order of addresses in the buffer 51A, first and second bus-access pattern information groups are stored into the banks A1 and A2 respectively. Then the first and second bus-access pattern information groups are sequentially taken out of the banks A1 and A2, and bus-access instructions according to the bus-access pattern information groups are issued in the order in which they were taken out.

The bus-access instruction issuance managing circuit (hereinafter an issuance managing circuit) 52 is connected to the bus (external bus) 15 and can perform bus access via the bus 15. The issuance managing circuit 52 receives bus-access issuing events A, B, C from the sequencer 30. For example, the bus-access issuing event A is information included in an access request AR from the sequencer 30 (see FIG. 2) and is an issuing event signal indicating whether issuing a bus-access instruction to the hardware engine 14-A is requested. The bus-access issuing event B is information included in an access request AR from the sequencer 30 (see FIG. 2) and is an issuing event signal indicating whether issuing a bus-access instruction to the hardware engine 14-B is requested. The bus-access issuing event C is information included in an access request AR from the sequencer 30 (see FIG. 2) and is an issuing event signal indicating whether issuing a bus-access instruction to the hardware engine 14-C is requested.

Where there is bus-access pattern information stored in the buffer 51A, 51B, 51C, the issuance managing circuit 52 manages the issuing of bus-access instructions based on the bus-access issuing events A, B, C. The bus-access instruction is an instruction designating access to an access destination (target) via the external bus 15. If the bus-access issuing event meets the condition for permission to issue specified by the bus-access issuing event information, then the issuance managing circuit 52 interprets the bus-access pattern of the designated buffer 51A, 51B, 51C to issue a bus-access instruction.

For example, the issuance managing circuit 52 has event managing circuits 522A, 522B, 522C, a selector 523, and a 'bus conversion+control circuit' (issuance processing circuit) 521. The selector 523 can select one satisfying the condition for permission to issue (e.g., one supplying an issuance permission signal) from among the event managing circuits 522A, 522B, 522C.

The event managing circuit 522A determines whether the bus-access issuing event A satisfies the condition for permission to issue specified by the bus-access pattern issuing event information in the buffer 51A. If determining that the bus-access issuing event A satisfies the condition for permission to issue, and the event managing circuits 522A is selected by the selector 523, then the event managing circuit 522A notifies permission to issue to the 'bus conversion+control circuit' 521. The 'bus conversion+control circuit' 521 issues a bus-access instruction to perform bus access to the hardware engine 14-A via the bus 15.

It should be noted that the description of the event managing circuit 522A also applies to the event managing circuits 522B and 522C.

There is the case where the plurality of buffers 51A, 51B, 51C simultaneously satisfy the condition for permission to issue. In this case, a round robin algorithm can be applied to the selector 523 of the issuance managing circuit 52. That is, when receiving issuance permission signals from the plurality of event managing circuits 522A, 522B, 522C simultaneously or within a predetermined time with which they could be regarded as simultaneous, the selector 523 selects an event managing circuit on a round robin basis and notifies issue permission from the selected event managing circuit to the 'bus conversion+control circuit' 521. Thus, control can be performed such that bus-access instructions are issued in order of time respectively for the buffers 51A, 51B, 51C without a hitch.

In the present embodiment, bus access to another hardware engine 14-A, 14-B, 14-C is fundamentally performed in a predetermined pattern. In order to perform bus access, information about the bus access type such as reading/writing, information about the address to access at, write data, and the like is needed. These are combined into one information that is bus-access pattern information.

Figure 4:
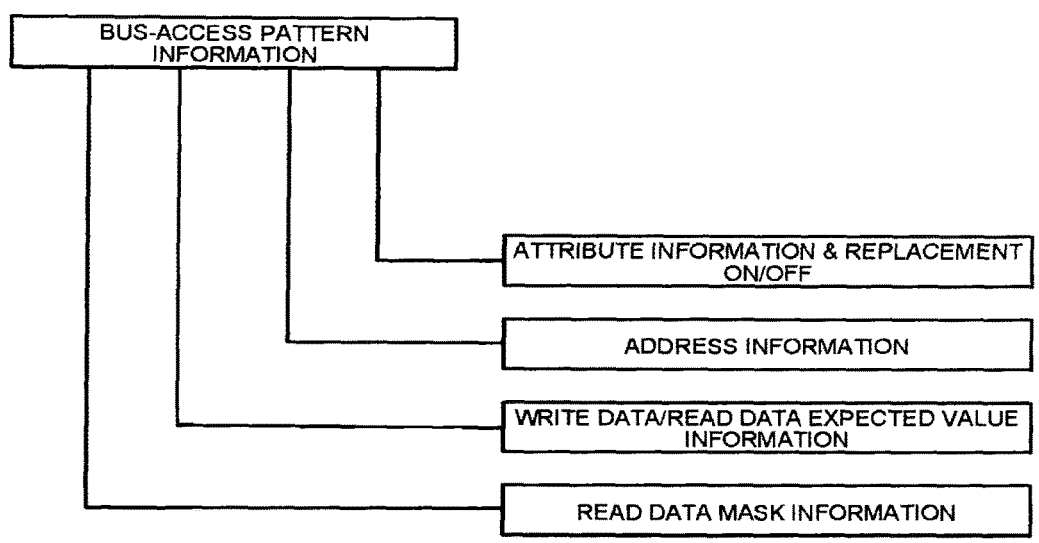
FIG. 4 is a diagram showing the data structure of bus-access pattern information in the embodiment.

The bus-access pattern information (bus access information) is information necessary for bus access. The bus-access pattern information is address information of a functional block (hardware engine 14) that is the target (access destination) used in bus access and information indicating the type of bus access such as reading/writing. The bus-access pattern information has, for example, a data structure as shown in FIG. 4. The bus-access pattern information shown in FIG. 4 basically includes information necessary for one bus access and is specific to bus access. The bus-access pattern information includes at least address information and bus-access attribute information and can further include ON/OFF information of the replacing function, write data/read data expected value information, and read data mask information.

The bus-access attribute information can designate a characteristic pattern used in a bus-access pattern such as register access. As to the types of basic bus-access instructions, there are two types, a read instruction and a write instruction, and in order to realize a characteristic bus-access pattern including data processing, which is executed intrinsically in the CPU 11, the bus access controller is configured such that a polling type and a read-modify-write type can be selected.

That is, the bus-access attribute information includes information designating the type of bus-access instruction. The types of bus-access instructions include, for example, at least one of a read instruction, a write instruction, a first read polling instruction, a second read polling instruction, and a read-modify-write instruction.

The read instruction is an instruction to read the value of a register (memory) of interest. The write instruction is an instruction to write a value into a register (memory) of interest.

The first read polling instruction is an instruction to read the value of a register (memory) of interest and continue reading until the value coincides with an expected value. Bits of the expected value subject to comparison can be specified. The comparison with the expected value can be performed for bits of the read data mask information that are at 1.

For example, let read data expected value information be 0x0000_0001 when the read data mask information is 0x0000_0101 (0x indicates being hexadecimal). This means that the expected value has its eighth bit=0 and its zeroth bit=1. Unless the eighth bit of the read value is 0, and the zeroth bit is 1, the value does not coincide with the expected value, and thus a read is executed again.

31:0->0001_0000_0001 0000_0000_0001

If, as the result of reading, the eighth bit is 0, and the zeroth bit is 1, the value coincides with the expected value, so that the execution of the first read polling instruction finishes.

The second read polling instruction is an instruction to read the value of a register (memory) of interest and continue reading until the value comes not to coincide with an expected value. Bits of the expected value subject to comparison can be specified. The comparison with the expected value can be performed for bits of the read data mask information that are at 1.

For example, let read data expected value information be 0x0000_0001 when the read data mask information is 0x0000_0101 (0x indicates being hexadecimal). This means that the expected value has its eighth bit=0 and its zeroth bit=1. If the eighth bit of the read value is 0, and the zeroth bit is 1, the value coincides with the expected value, and thus a read is executed again.

If, as the result of reading, the eighth bit is not 0, or the zeroth bit is not 1, the value does not coincide with the expected value, so that the execution of the second read polling instruction finishes.

The read-modify-write instruction is one to read the value of a register (memory) of interest and replace part desired to be replaced (bits to be replaced can be arbitrarily specified by the read data mask information) with write data information to write into the register of interest.

For example, let the read data mask information be 0xFFFF_0000 and the write data information be 0x1234_5678. If a read is executed in this state, and the read data is 0x2453_189D, then bits of the read data whose corresponding read data mask information bits are at 1 are replaced with the write data information, and bits of the read data whose corresponding read data mask information bits are at 0 are left unchanged, so that the new write data is 0x1234_189D. This 0x1234_189D is written into the register of interest.

The ON/OFF information of the replacing function is information designating whether to have the replacing circuit 50 replace the bus-access pattern information with replace information. For example, even with a pattern of bus access to the same access destination, the address may vary somewhat or data itself may change depending on the situation. Preparing such variations on bus-access pattern information in order to deal with this situation would cause an increase in the memory capacity of the memory 43 and thus may increase the cost of the bus access controller 40. In order to suppress an increase in the memory capacity of the memory 43, part of the bus-access pattern information is replaced with replace information so that a partial change in the address, data, or the like can be dealt with by changing part of the same basic bus-access pattern information.

In the present embodiment, in bus access to another hardware engine 14-A, 14-B, 14-C, multiple bus accesses are performed in a sequence pattern. That is, the memory 43 stores a bus-access information group including a plurality of bus-access pattern information and information about the execution order of the plurality of bus-access pattern information. The memory 43 stores a plurality of bus-access pattern information groups and supplies the bus-access pattern information group designated by the bus-access pattern memory read address from among the plurality of bus-access pattern information groups to the replacing circuit 50. Thus, each buffer 51A, 51B, 51C stores a bus-access pattern information group including a plurality of bus-access pattern information and information about the execution order of the plurality of bus-access pattern information.

Figure 5:
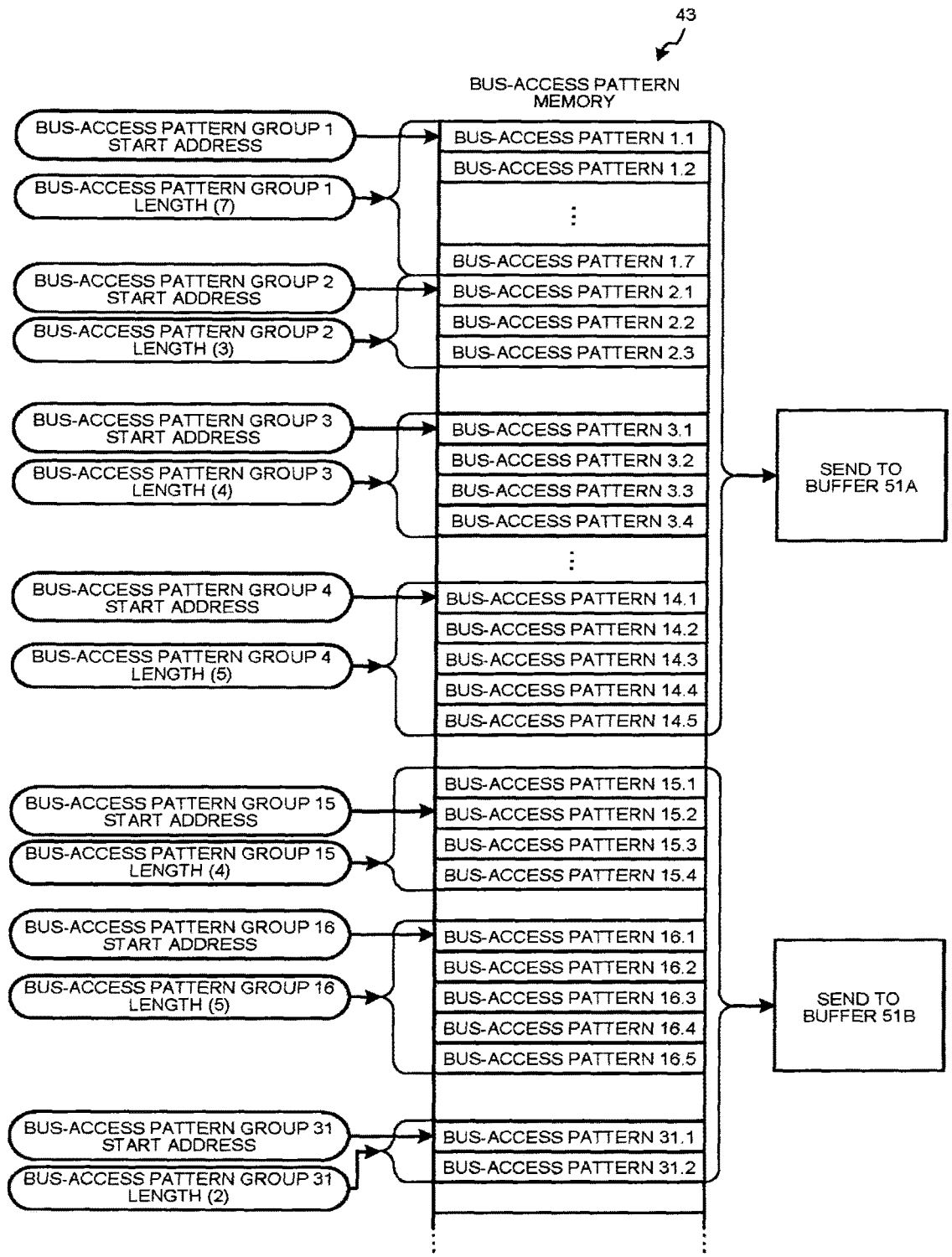
FIG. 5 is a diagram showing information stored in a bus-access pattern memory in the embodiment.

For example, the memory 43 stores a plurality of bus-access pattern information groups as shown in FIG. 5. FIG. 5 is a diagram showing the bus-access pattern information stored in the memory 43.

Bus access is usually constituted by a plurality of reads or writes or a mix thereof, not a single bus access only, and hence in order to make it be able to deal with those constitutions, the bus access controller is configured such that a plurality of bus-access pattern information can be managed in one set (bus-access pattern information group).

In the memory 43, each sequence pattern of bus accesses are put together as a bus-access pattern information group and are placed at, e.g., consecutive addresses as shown in FIG. 5. All the bus-access pattern information that are bases can be set in one memory 43.

In this case, each bus-access pattern information group is designated and managed using the bus-access pattern setting information (see FIG. 3). The bus-access pattern setting information includes the start address of a bus-access pattern information group in the memory 43 and the number of bus-access pattern information (expressed as a bus-access pattern length in FIG. 5) included in the bus-access pattern information group.

Where a read is performed under the condition that any bus-access pattern information group is to be executed, the number of the information group of interest can be designated by the bus-access pattern selecting information (see FIG. 3). For example, if the bus-access pattern information group 1 shown in FIG. 5 is to be executed, a number of 1 is specified.

The designated bus-access pattern information group is consecutively read from the memory 43 (see FIG. 3). The read information is first transferred to the replacing circuit 50 (see FIG. 3).

This circuit replaces the bus-access pattern information with replace information depending on the ON/OFF information of the replacing function included in the bus-access pattern information. For example, if the address needs to be replaced, the replacing circuit 50 replaces the address in the bus-access pattern information with replace information (an address) according to ON information of the ON/OFF information of the replacing function to transfer to the buffer 51A, 51B, 51C. If there is no need to replace, the replacing circuit 50 transfers the bus-access pattern information unchanged to the buffer 51A, 51B, 51C according to OFF information of the ON/OFF information of the replacing function.

Distributing the plurality of bus-access pattern information groups stored in the memory 43 to the plurality of buffers 51A, 51B, 51C is performed using the bus-access pattern selecting information. For example, for the bus-access pattern selecting information of 0 to 14, they are sent to the buffer 51A and, for the bus-access pattern selecting information of 15 to 31, to the buffer 51B.

The issuing of bus-access instructions according to the respective bus-access pattern information registered in the buffers 51A, 51B, 51C is managed by the issuance managing circuit 52. The issuance managing circuit 52 does not issue a bus-access instruction according to the bus-access pattern information registered in the buffer 51A, 51B, 51C without a condition, but manages its issuing according to the bus-access issuing event A to C received from the sequencer 30.

The issuing of a bus-access instruction according to the bus-access pattern information stored in the buffer 51A, 51B, 51C requires satisfying the condition for permission to issue specified by the bus-access pattern issuing event information as shown in FIG. 6. FIG. 6 is a diagram showing the condition for permission to issue a bus-access instruction.

The bus-access pattern issuing event information includes event enable and an event condition shown in FIG. 6. The event enable designates whether to permit issuing a bus-access instruction regardless of the value of the bus-access issuing event without a condition, that is, whether to make the event condition active or non-active. The event condition, when made active, specifies the issuing event value (1 or 0) with which to permit issuing a bus-access instruction.

If the value of the event enable is at 0, the event condition is made non-active so as to permit issuing a bus-access instruction regardless of the value of the bus-access issuing event, without a condition.

If the value of the event enable is at 1, the event condition is made active so as to permit issuing a bus-access instruction depending on the value of the bus-access issuing event. At this time, if the value of the event condition is at 0, when the value of the bus-access issuing event is at 0, issuing a bus-access instruction is permitted. If the value of the event condition is at 1, when the value of the bus-access issuing event is at 1, issuing a bus-access instruction is permitted.

For example, where the event enable value of 1 and the event condition value of 1 are set for the bus-access pattern information group 1 registered in the buffer 51A, the issuance managing circuit 52 does not issue a bus-access instruction according to the bus-access pattern information group of interest but waits when the value of the bus-access issuing event A received from the sequencer 30 is at 0. Then when the value of the bus-access issuing event A received from the sequencer 30 becomes 1, the issuance managing circuit 52 issues a bus-access instruction according to the bus-access pattern information group of interest.

Figure 7:
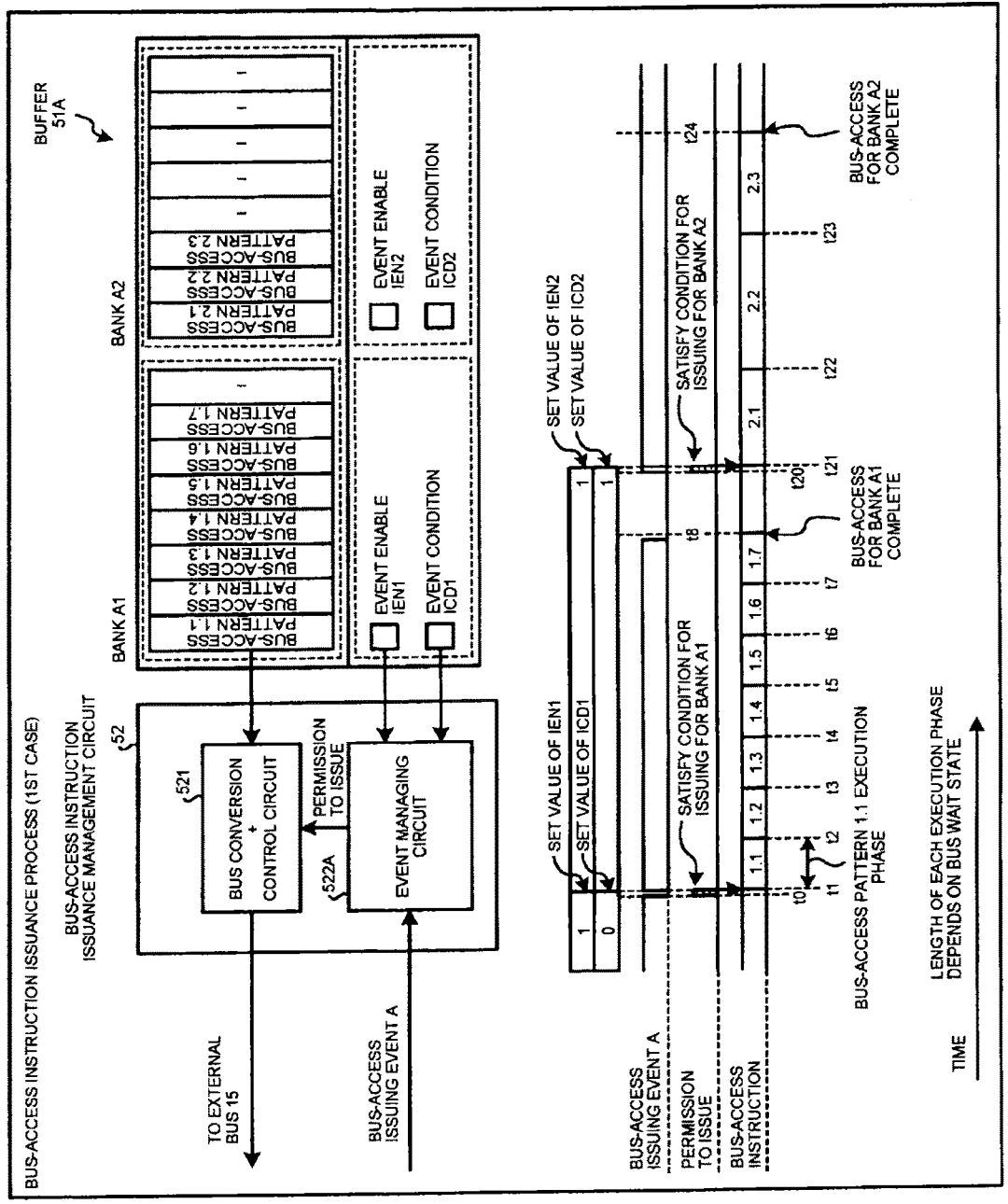
FIG. 7 is a diagram showing a bus-access instruction issuance process (a first case) in the embodiment.
Figure 8:
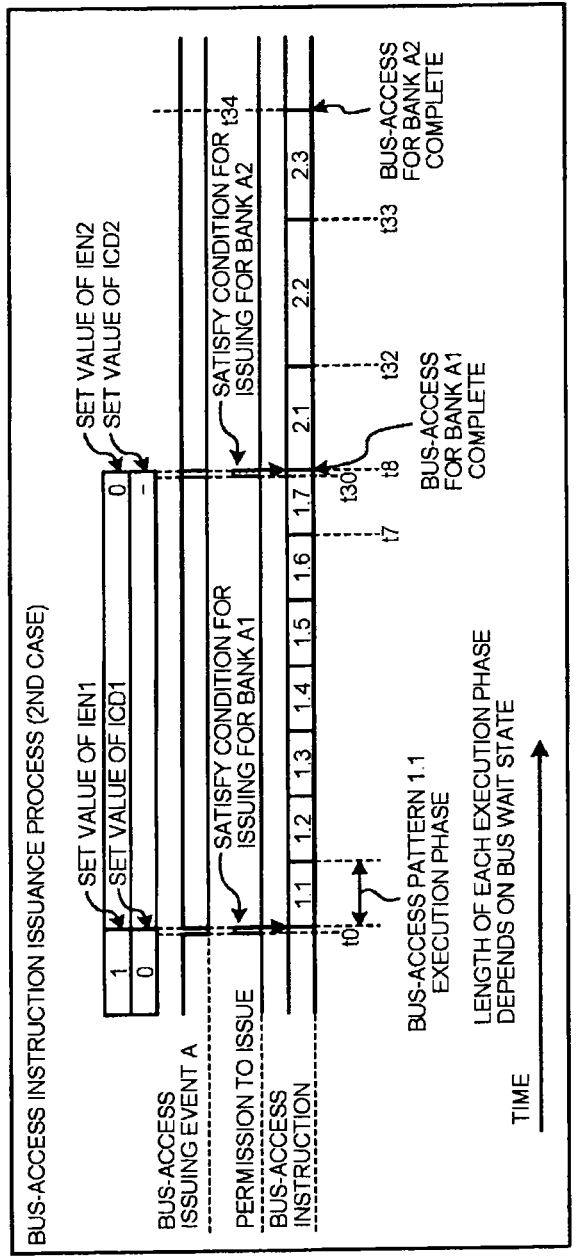
FIG. 8 is a diagram showing a bus-access instruction issuance process (a second case) in the embodiment.
Figure 9:
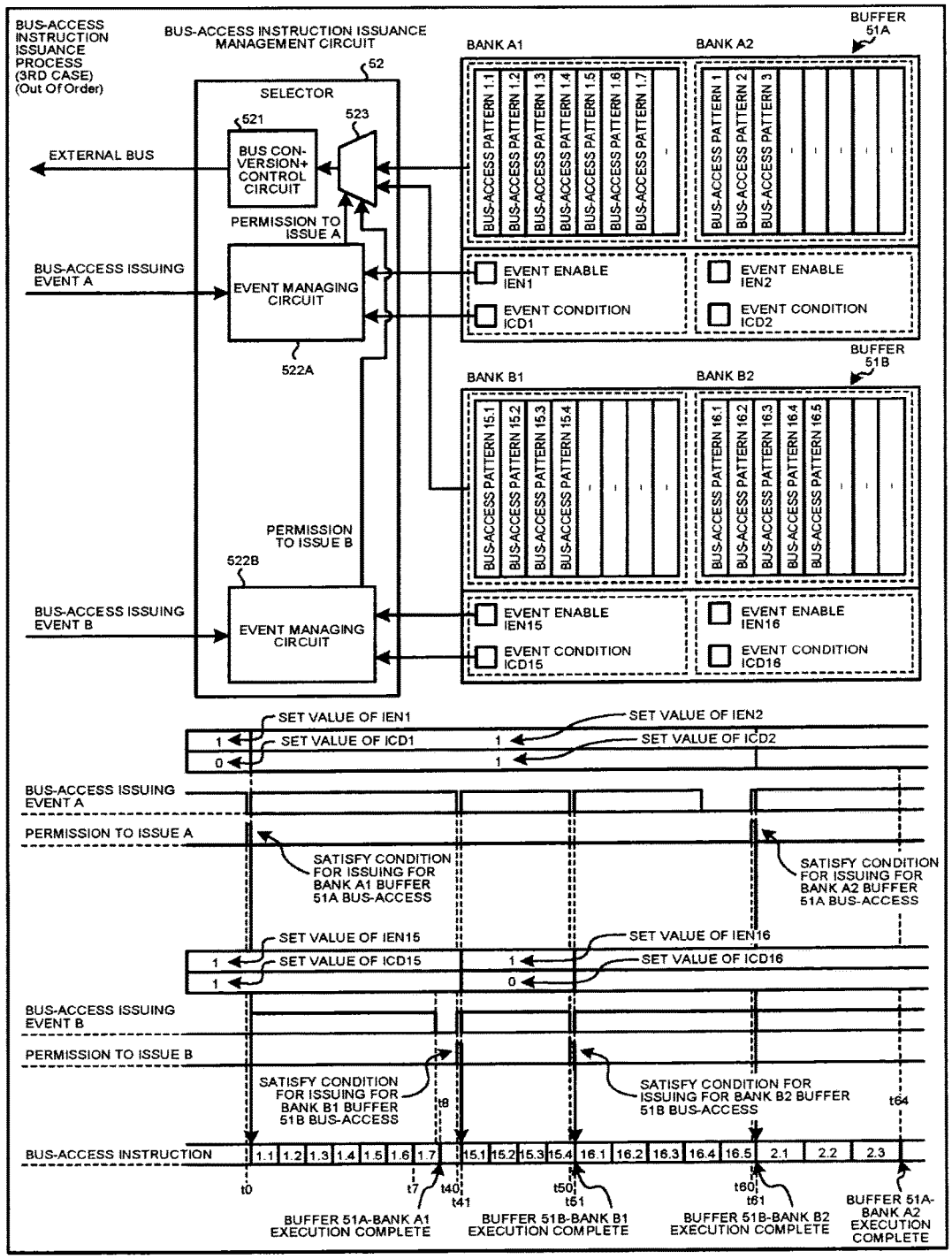
FIG. 9 is a diagram showing a bus-access instruction issuance process (a third case) in the embodiment.

Next, specific cases of issuing bus-access instructions will be described using FIGS. 7 to 9. FIG. 7 is a diagram showing a first case. FIG. 8 is a diagram showing a second case. FIG. 9 is a diagram showing a third case.

In the first case shown in FIG. 7, the bus-access pattern information group 1, the event enable IEN1, and the event condition ICD1 are stored in the bank A1 in the buffer 51A. The bus-access pattern information group 1 includes bus-access pattern information 1.1 to bus-access pattern information 1.7. The bus-access pattern information group 1 is associated with the event enable IEN1 and the event condition ICD1. The value of the event enable IEN1 is set at 1, and the value of the event condition ICD1 is set at 0.

Further, the bus-access pattern information group 2, the event enable IEN2, and the event condition ICD2 are stored in the bank A2 in the buffer 51A. The bus-access pattern information group 2 includes bus-access pattern information 2.1 to bus-access pattern information 2.3. The bus-access pattern information group 2 is associated with the event enable IEN2 and the event condition ICD2. The value of the event enable IEN2 is set at 1, and the value of the event condition ICD2 is set at 1.

Immediately before timing t0 shown in FIG. 7, the bus-access issuing event A is at 1, so that the bus-access issuing event A does not satisfy the condition for permission to issue for the bank A1, and thus a bus-access instruction for the bank A1 is not issued.

At timing t0 shown in FIG. 7, the bus-access issuing event A becomes 0, so that the bus-access issuing event A satisfies the condition for permission to issue for the bank A1, and thus at timing t1 immediately after that, a bus-access instruction "1.1" according to bus-access pattern information 1.1 of the bank A1 is issued.

At timing t2, the bus-access instruction "1.1" finishes, and a bus-access instruction "1.2" according to bus-access pattern information 1.2 of the bank A1 is issued. The period from timing t2 to t3 is the execution phase of the bus-access instruction "1.1" according to bus-access pattern information 1.1.

Likewise, from timing t3 to t7, bus-access instructions "1.3" to "1.7" according to bus-access pattern information 1.3 to bus-access pattern information 1.7 of the bank A1 are sequentially issued.

At timing t8, the execution of the sequence of the bus-access instructions "1.1" to "1.7" according to the bus-access pattern information group 1 of the bank A1 is completed. Immediately after the completion, the bus-access pattern information group 2 of the next bank A2 becomes subject to issuing. However, at this point in time, the bus-access issuing event A is at 0, so that the bus-access issuing event A does not satisfy the condition for permission to issue for the bank A2, and thus a bus-access instruction for the bank A2 is not issued.

At timing t20 shown in FIG. 7, the bus-access issuing event A becomes 1, so that the bus-access issuing event A satisfies the condition for permission to issue for the bank A2, and thus at timing t21 immediately after that, a bus-access instruction "2.1" according to bus-access pattern information 2.1 of the bank A2 is issued.

At timing t22, the bus-access instruction "2.1" finishes, and a bus-access instruction "2.2" according to bus-access pattern information 2.2 of the bank A2 is issued.

Likewise, at timing t23, a bus-access instruction "2.3" according to bus-access pattern information 2.3 of the bank A2 is issued.

At timing t24, the execution of the sequence of the bus-access instructions "2.1" to "2.3" according to the bus-access pattern information group 2 of the bank A2 finishes.

It should be noted that the bus-access pattern information group registered in the bank concerned is defined as a sequence of bus-access pattern information. Hence, once the condition for permission to issue is satisfied, even if the condition for permission to issue comes not to be satisfied immediately after that, all the bus-access instructions according to the sequence of bus-access pattern information may be issued.

The second case shown in FIG. 8 is basically the similar to the first case, but differs from the first case in that the value of the event enable IEN2 is set at 0 and that the value of the event condition ICD2 is set at "-" (means the set value is invalid).

Similar process to that in the first case is performed from timing t0 to t7.

At timing t30 immediately before timing t8, it is detected to be the execution completion timing of the bus-access instruction "1.7". The bus-access pattern information group 2 of the next bank A2 becomes subject to issuing. At this time, because the value of the event enable IEN2 is set at 0 so that the value of the bus-access issuing event A is to be ignored, the bus-access issuing event A satisfies the condition for permission to issue.

At timing t8, the execution of the sequence of the bus-access instructions "1.1" to "1.7" according to the bus-access pattern information group 1 of the bank A1 is completed. Immediately after the completion, a bus-access instruction "2.1" according to bus-access pattern information 2.1 of the bank A2 is issued.

At timing t32, the bus-access instruction "2.1" finishes, and a bus-access instruction "2.2" according to bus-access pattern information 2.2 of the bank A2 is issued.

Likewise, at timing t33, a bus-access instruction "2.3" according to bus-access pattern information 2.3 of the bank A2 is issued.

At timing t34, the execution of the sequence of the bus-access instructions "2.1" to "2.3" according to the bus-access pattern information group 2 of the bank A2 finishes.

In the second case, as soon as the sequence of the bus-access instructions according to the bus-access pattern information group 1 finishes, the sequence of the bus-access instructions according to the bus-access pattern information group 2 are executed, and thus the execution time of bus-access instructions for the banks A1, A2 can be shortened as compared with the first case.

The third case shown in FIG. 9 illustrates the case where the issuance managing circuit 52 issues bus-access instructions to a plurality of different access destinations out of order. The issuance managing circuit 52 manages issuing bus-access instructions for each target in order to guarantee out-of-order execution between different targets.

The bus access controller 40 is configured in such a way that respective bus-access patterns for different targets are not stored in the same buffer (see FIG. 3). Setting is performed in such a way that respective bus-access pattern information for different targets are not stored in the same buffer. Hence, it is less likely to happen that bus access to a target is delayed because a hitch occurs with bus access to another target.

The issuance managing circuit 52 manages issuing bus-access instructions according to the bus-access pattern information registered in each buffer 51A, 51B, 51C. The condition for permission to issue bus-access instructions is determined according to the corresponding bus-access issuing event.

In the third case, bus-access instructions are issued in the order of the bank A1 of the buffer 51A, the bank B1 of the buffer 51B, the bank B2 of the buffer 51B, and the bank A2 of the buffer 51A because of the action of the bus-access issuing events A, B.

It should be noted that a bus-access pattern information group 15, event enable IEN15, and event condition ICD15 are stored in the bank B1 of the buffer 51B. The bus-access pattern information group 15 includes bus-access pattern information 15.1 to bus-access pattern information 15.4. The bus-access pattern information group 15 is associated with the event enable IEN15 and the event condition ICD15. The value of the event enable IEN15 is set at 1, and the value of the event condition ICD15 is set at 1.

Further, a bus-access pattern information group 16, event enable IEN16, and event condition ICD16 are stored in the bank B2 of the buffer 51B. The bus-access pattern information group 16 includes bus-access pattern information 16.1 to bus-access pattern information 16.5. The bus-access pattern information group 16 is associated with the event enable IEN16 and the event condition ICD16. The value of the event enable IEN16 is set at 1, and the value of the event condition ICD16 is set at 0.

Similar process to that in the first case is performed from timing t0 to t7 shown in FIG. 9.

At timing t8, the execution of the sequence of the bus-access instructions "1.1" to "1.7" according to the bus-access pattern information group 1 of the bank A1 is completed. Immediately after the completion, the bus-access pattern information group 2 of the bank A2 or the bus-access pattern information group 15 of the bank B1 becomes subject to issuing. However, at this point in time, the bus-access issuing event A does not satisfy the condition for permission to issue for the bank A2, and thus a bus-access instruction for the bank A2 is not issued. Also, the bus-access issuing event B does not satisfy the condition for permission to issue for the bank B1, and thus a bus-access instruction for the bank B1 is not issued.

At timing t40 shown in FIG. 9, the bus-access issuing event B becomes 1, so that the bus-access issuing event B satisfies the condition for permission to issue for the bank B1, and thus at timing t41 immediately after that, a bus-access instruction "15.1" according to bus-access pattern information 15.1 of the bank B1 is issued.

At timing t50 immediately before timing t51, in response to being close to the execution completion timing of the bus-access instruction "15.4", the bus-access pattern information group 2 of the next bank B2 becomes subject to issuing. At this time, the bus-access issuing event B becomes 0, so that the bus-access issuing event B meets the condition for permission to issue for the bank B2.

At timing t51, the execution of the sequence of the bus-access instructions "15.1" to "15.4" according to the bus-access pattern information group 1 of the bank B1 is completed. Immediately after the completion, a bus-access instruction "16.1" according to bus-access pattern information 16.1 of the bank B2 is issued.

At timing t60 immediately before timing t61, in response to detecting the execution completion of the bus-access instruction "16.5", the bus-access pattern information group 2 of the next bank A2 becomes subject to issuing. At this time, the bus-access issuing event A becomes 1, so that the bus-access issuing event A satisfies the condition for permission to issue for the bank A2.

At timing t61, the execution of the sequence of the bus-access instructions "16.1" to "16.5" according to the bus-access pattern information group 1 in the bank B2 is completed. Immediately after the completion, a bus-access instruction "2.1" according to bus-access pattern information 2.1 of the bank A2 is issued. At this point in time, the buffer 51B side overtakes the buffer 51A side to finish bus access earlier.

At timing t64, the execution of the sequence of the bus-access instructions "2.1" to "2.3" according to the bus-access pattern information group 2 of the bank A2 is completed.

In the third case, although the order in which the condition for permission to issue is satisfied on a buffer unit basis is the order of buffer 51A and buffer 51B, bus-access instructions are issued in the order in which the condition for permission to issue is satisfied on a bank unit basis (the order of bank A1, bank B1, bank B2, and bank A2). That is, bus accesses to different access destinations (e.g., hardware engines 14-A, 14-B) can be performed out of order (regardless of issuing order), and hence efficient accesses are possible.

As described above, in the embodiment, bus-access pattern information can be set in the memory 43 in the bus access controller 40. The multiple buffers 51A to 51C store the bus-access pattern information set in the memory 43. The issuance managing circuit 52 issues a bus-access instruction according to bus-access information stored in a buffer selected from among the multiple buffers 51A to 51C in response to an access request. Thus, where register accesses for having peripheral blocks operate a particular function and ascertaining the result are needed, information such as addresses and data of the register accesses and the order of their execution can be made settable in the controller 10. That is, where a bus-access pattern needs to be changed because of product unfoldment or a change to a function of a peripheral block, the change can be dealt with by setting in software, and thus a change to hardware can be made unnecessary. As a result, various changes in the specification can be dealt with flexibly and without a change to hardware, and thus an increase in the development cost of the memory system 100 can be suppressed.

Further, in the embodiment, the issuance managing circuit 52 in the bus access controller 40 issues bus-access instructions to multiple different access destinations out of order. Thus, bus accesses to different targets are performed out of order, and hence, if there are blocks accessible as targets, access can be performed without waste and efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bus access controller comprising:
a memory in which plural pieces of first information necessary for bus access are settable;
a replacing circuit that replaces at least part of second information with replace information to create third information, the second information being information selected from the plural pieces of first information in response to a request;
multiple buffers that store the third information; and
an issuance circuit connected to a plurality of target circuits via a bus,
wherein the third information includes address information indicating one circuit out of the plurality of target circuits, and
the issuance circuit issues a bus access instruction to access the one circuit indicated by the address information included in the third information.

2. The bus access controller according to claim 1, wherein
the multiple buffers correspond to the plurality of target circuits and store information different in their access destination from each other, and
the issuance circuit issues a bus access instruction according to third information stored in a buffer selected from among the multiple buffers in response to the request.

3. The bus access controller according to claim 2, wherein
each of the multiple buffers stores an information group including a plurality of information and information about execution order of the plurality of information.

4. The bus access controller according to claim 3, wherein
number of information to be included in the information group is settable arbitrarily.

5. The bus access controller according to claim 1, wherein
information that is a base for information to be stored in the buffers is settable in the memory.

6. The bus access controller according to claim 1, wherein
the second information includes ON/OFF information to switch on/off a replacement by the replacing circuit,
wherein the replacing circuit replaces at least part of the second information with replace information to create the third information to be stored in the buffer if the ON/OFF information is set at ON and creates the third information to be stored in the buffer without replacing at least part of the second information with the replace information if the ON/OFF information is set at OFF.

7. The bus access controller according to claim 1, wherein
the second information includes an expected value for write data for, or read data of, an access destination.

8. The bus access controller according to claim 1, wherein
the second information includes an expected value for read data of an access destination and mask information to mask the read data of the access destination.

9. The bus access controller according to claim 1, wherein
the second information includes attribute information designating a type of bus-access instruction.

10. The bus access controller according to claim 9, wherein
the attribute information includes information designating at least one of a read instruction, a write instruction, read polling instructions, and a read-modify-write instruction.

11. The bus access controller according to claim 10, wherein
the read polling instructions include at least one of an instruction to repeat reading data until the read data coincides with an expected value and an instruction to repeat reading data until the read data comes not to coincide with an expected value.

12. The bus access controller according to claim 1, wherein
the issuance circuit issues bus-access instructions to multiple different access destinations out of order.

13. The bus access controller according to claim 12, wherein
the issuance circuit selects one of the multiple buffers out of order and issues a bus-access instruction according to information stored in the selected buffer.

14. The bus access controller according to claim 13, wherein the issuance circuit has:
a first event managing circuit that receives a first bus-access issuing event to output a first issuance permission signal;
a second event managing circuit that receives a second bus-access issuing event to output a second issuance permission signal;
a selector that selects one information from among a plurality of the stored information according to a selected one of the first issuance permission signal and the second issuance permission signal; and
an issuance processing circuit that issues a bus-access instruction according to the information selected by the selector.

15. A hardware engine comprising:
a sequencer; and
the bus access controller according to claim 1 that performs bus access in response to a request from the sequencer.

16. A controller comprising:
a plurality of the hardware engines each according to claim 15; and
a bus that connects the plurality of hardware engines to each other.

17. The controller according to claim 16, wherein
bus access controllers respectively included in the plurality of hardware engines are configured to operate in parallel.

18. A memory system comprising:
a nonvolatile semiconductor memory; and
the controller according to claim 16 that controls the nonvolatile semiconductor memory.

* * * * *